(12) United States Patent
Johnston et al.

(10) Patent No.: US 10,521,757 B2
(45) Date of Patent: Dec. 31, 2019

(54) SYSTEM AND METHOD OF HOTEL TRAY AND TROLLEY RETRIEVAL

(71) Applicants: Joshua Paul Johnston, New Orleans, LA (US); William Bret Lovett, Jr., Charleston, SC (US)

(72) Inventors: Joshua Paul Johnston, New Orleans, LA (US); William Bret Lovett, Jr., Charleston, SC (US)

(73) Assignee: BETTER NOW LLC, New Orleans, LA (US)

( * ) Notice: Subject to any disclaimer, the term of this patent is extended or adjusted under 35 U.S.C. 154(b) by 0 days.

(21) Appl. No.: 16/101,011

(22) Filed: Aug. 10, 2018

(65) Prior Publication Data

US 2019/0026694 A1  Jan. 24, 2019

Related U.S. Application Data

(60) Provisional application No. 62/518,124, filed on Jun. 12, 2017.

(51) Int. Cl.
| | |
|---|---|
| *G06Q 10/08* | (2012.01) |
| *H04L 29/08* | (2006.01) |
| *G06Q 10/06* | (2012.01) |
| *G06Q 50/12* | (2012.01) |

(52) U.S. Cl.
CPC ......... *G06Q 10/0833* (2013.01); *G06Q 10/06* (2013.01); *G06Q 50/12* (2013.01); *H04L 67/04* (2013.01); *H04L 67/22* (2013.01); *H04L 67/26* (2013.01)

(58) Field of Classification Search
CPC .... G06Q 10/06; G06Q 10/0833; G06Q 50/12; H04L 67/04; H04L 67/26
See application file for complete search history.

(56) References Cited

U.S. PATENT DOCUMENTS

2005/0030176 A1*  2/2005  Wagner ............... G07C 9/00111
340/539.13

* cited by examiner

*Primary Examiner* — Orlando Bousono
(74) *Attorney, Agent, or Firm* — Dunlap Bennett & Ludwig PLLC

(57) ABSTRACT

A system and method of hotel tray and trolley retrieval including a notification device and a computing system wirelessly connected by a network. When in use, the notification device is assigned to a room number of a hotel room via software running on the computing system. A tray and/or a trolley is delivered to the hotel room with the notification device. The hotel patron may then activate the activation device of the notification device. The notification device then sends a wireless communication to the computing system over the network indicating that the tray and/or trolley is ready for pickup from the hotel room.

8 Claims, 3 Drawing Sheets

SYSTEM AND METHOD OF HOTEL TRAY AND TROLLEY RETRIEVAL

CROSS-REFERENCE TO RELATED APPLICATION

This application claims the benefit of priority of U.S. provisional application No. 62/518,124, filed Jun. 12, 2017, the contents of which are herein incorporated by reference.

BACKGROUND OF THE INVENTION

The present invention relates to a system and method of tray and trolley retrieval and, more particularly, to a system and method of using a push activated button integrated with a software platform to retrieve room service trays and trolleys.

Room service or in-room dining is a hotel service enabling guests to choose menu items for delivery to their hotel room for consumption there, served by staff. Room service is organized as a subdivision within the Food & Beverage Department of high-end hotel and resort properties.

Room Service trays and trolleys are notorious in the hotel and resort industry for being difficult to track and manage. They are a constant nuisance to management and a source of revulsion to hotel guests when left outside in the guest hallway for any length of time. As hotel companies continue to tighten labor standards the challenge of prompt retrieval and tracking has become more difficult. Simply put, room service is a convenience that quickly turns into an inconvenience.

As can be seen, there is a need for an efficient and easy way to communicate that a tray and trolley needs to be retrieved.

SUMMARY OF THE INVENTION

In one aspect of the present invention, a method of tracking and retrieving at least one of a tray and a trolley during a room service order comprises the steps of: providing a notification device comprising: an activation device; and a wireless communication interface; assigning the notification device to a room number of a hotel room via software running on a computing system; delivering the at least one of the tray and the trolley to the hotel room with the notification device; and activating the activation device of the notification device, and thereby sending a wireless communication to the computing system via the wireless communication interface indicating the at least one of the tray and the trolley is ready for pickup from the hotel room.

In another aspect of the present invention, a system of tracking and retrieving at least one of a tray and a trolley during a room service order comprises: a notification device comprising: an activation device; and a wireless communication interface; a computing system comprising: a processor; a memory; a wireless communication interface; and a user interface, wherein the notification device is assigned to a room number of a hotel room via the computing system, and upon activation of the activation device of the notification device, a wireless communication is sent from the notification device to the computing system via the wireless communication interfaces indicating the at least one of the tray and the trolley is ready for pickup from the hotel room.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a system and method of wireless communication for tray and trolley retrieval by a click of button. When a guest orders room service the staff registers a button to the guest room number through a computing system. The button is disposed on the guest's tray or trolley. The tray or trolley and button are delivered to the guest's room. The button may be labeled "Click For Retrieval" or include other instructions indicating that the button should be activated when the guest is finished with their meal. Once the guest is finished with their meal, the guest applies pressure to the button to notify the staff they are ready for retrieval. The button may use wireless communication to communicate in near real time to the hotel staff through a computing system that the tray or trolley is ready for retrieval.

Figure 2:
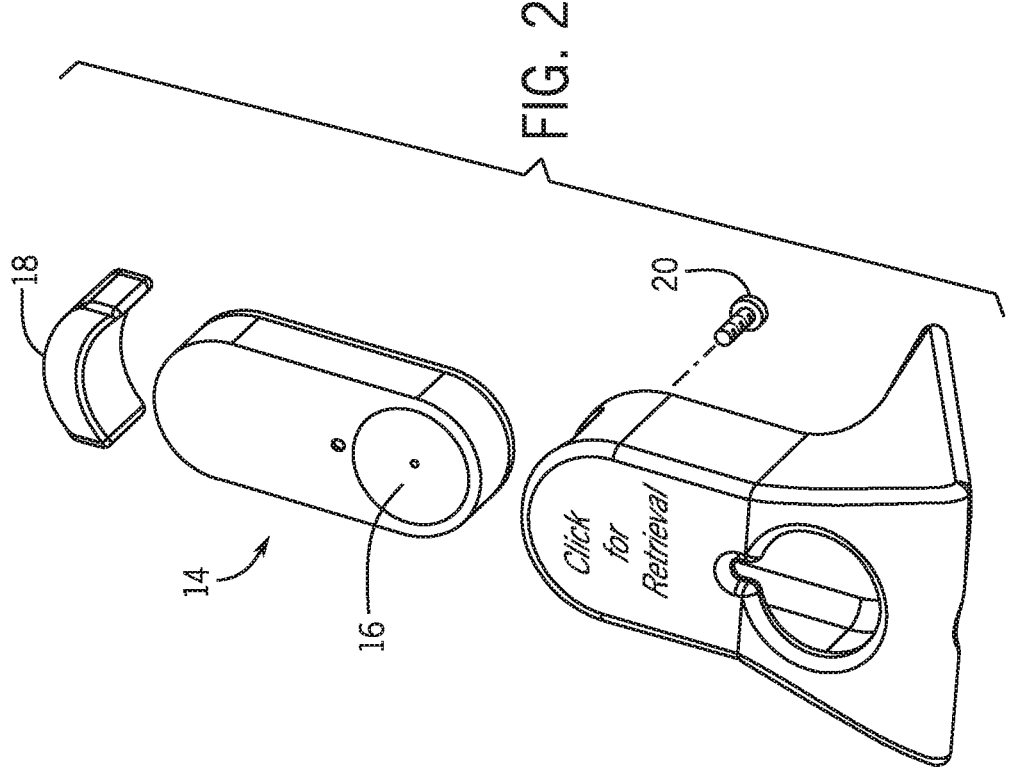
FIG. 2 is an exploded perspective view of an embodiment of the present invention.
Figure 1:
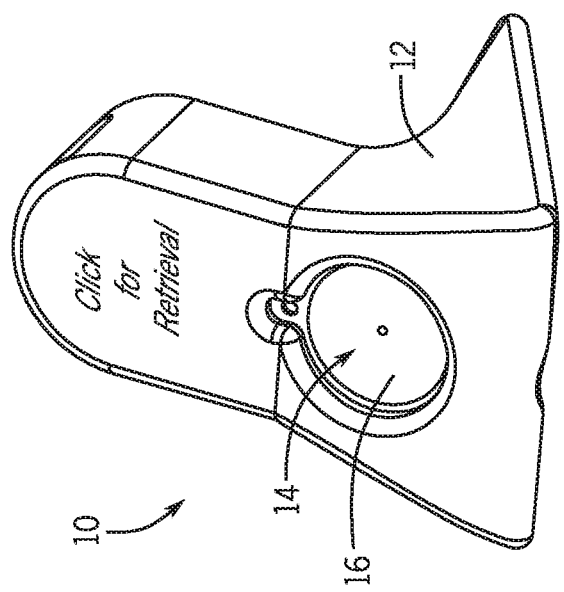
FIG. 1 is a perspective view of an embodiment of the present invention.
Figure 3:
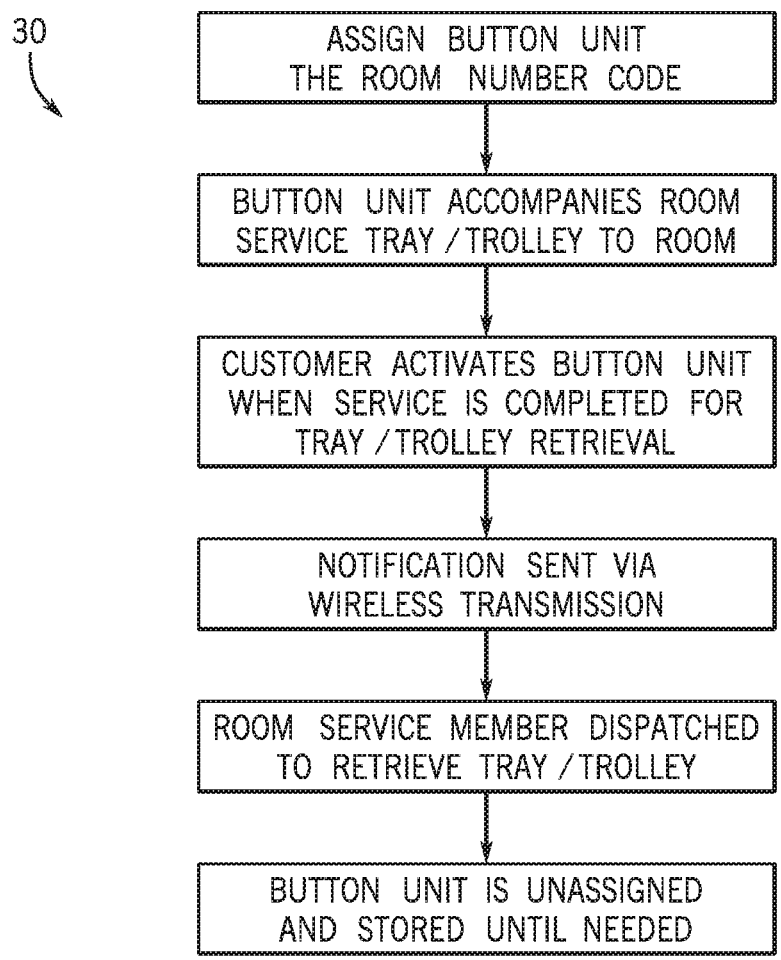
FIG. 3 is a flowchart of a method of an embodiment of the present invention.
Figure 4:
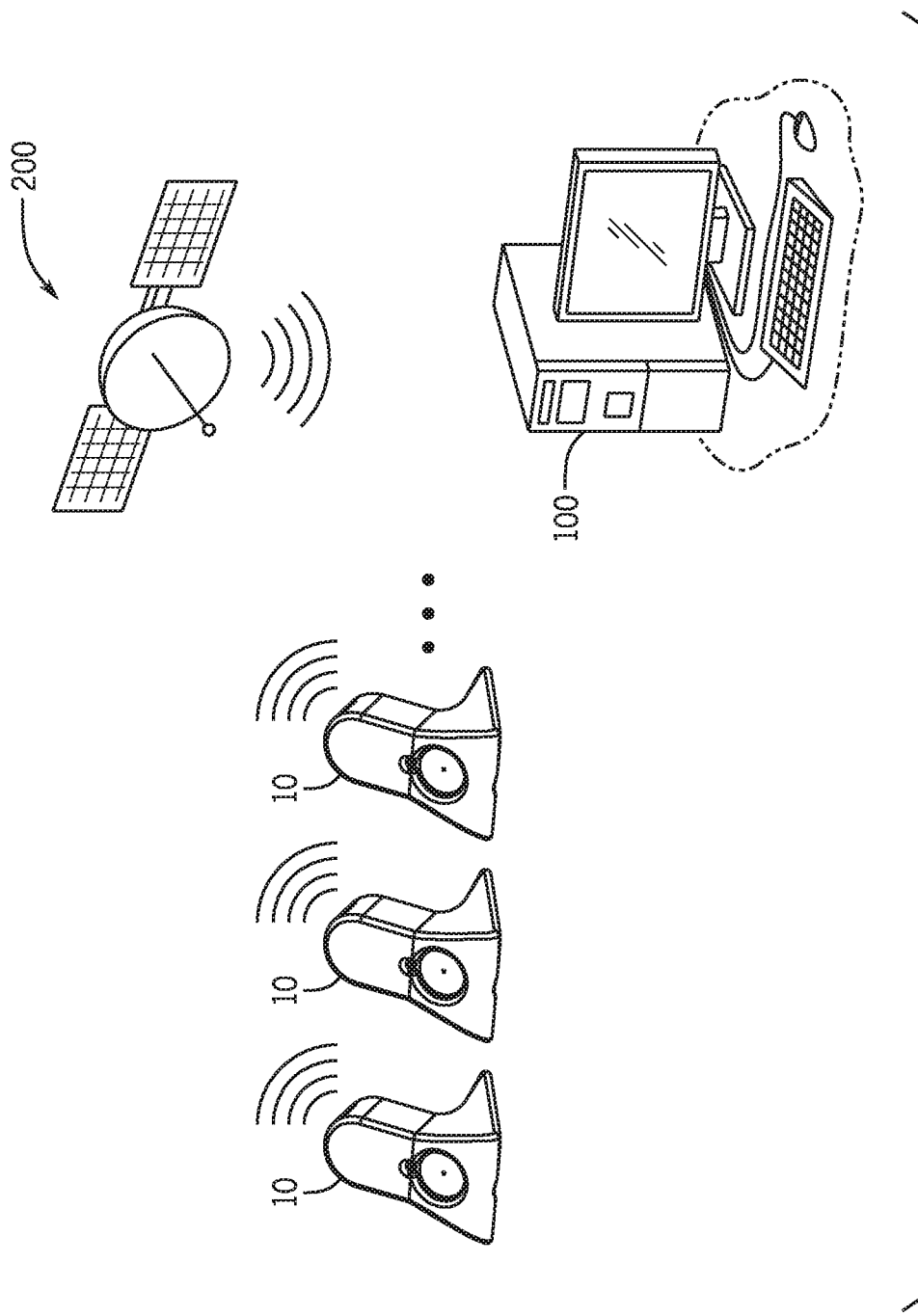
FIG. 4 is a schematic view of an embodiment of the present invention.

Referring to FIGS. 1 through 4, the present invention includes notification device 10 and a computing system 100 wirelessly connected by a network 200. When in use, the notification device is assigned to a room number of a hotel room via software running on the computing system. A tray and/or a trolley is delivered to the hotel room with the notification device 10. The hotel patron may then activate the activation device of the notification device 10. The notification device 10 then sends a wireless communication to the computing system 100 over the network 200 indicating that the tray and/or trolley is ready for pickup from the hotel room.

The present invention may include a plurality of notification devices 10 each in wireless communication with the computing system 100 over the network 200. Each of the notification devices 10 include an activation device 16 and a wireless communication interface for wirelessly communicating over the network 200 with the computing system 100. The activation device 16 may be a pressure activated button, a voice command microphone, a proximity sensor button, or the like. For example, the pressure activated button may be at least one of a mechanical button and a touchscreen button. Each of the plurality of notification devices 10 may further include an identifier, such as a number. Therefore, during the assigning process, a user may assign the identifier of the notification device 10 with the room number of the hotel room.

The notification devices 10 may each further include a housing 12 and a communication device 14 disposed within the housing 12. The communication device 14 includes the wireless communication interface and the activation device 16. In certain embodiments, the housing 12 includes a sleeve that slidably receives the communication device 14. A cap 18 may releasably retain the communication device 14 within the housing 12 via a retention screw 20 or other mechanical retention device, such as clips and snaps. This allows the activation device 16 to be easily removed so that the housing 12 may be cleaned or the activation device 16 may be transferred to a new housing 12. In certain embodiments, the housing 12 may be directly coupled to the tray and/or the trolley. Further, the housing 12 may be labeled "Click For Retrieval" or another instruction indicating that the activation device 16 should be activated when the guest is finished with their meal.

As mentioned above, the notification device 10 is in wireless communication with a computing system 100. The computing system 100 may include a desktop, laptop, server, smart device (smart phone and tablet computer), or a combination thereof. The computing system 100 is at least the processor and the memory. The computing system 100 may execute on any suitable operating system such as IBM's zSeries/Operating System (z/OS), MS-DOS, PC-DOS, MAC-iOS, WINDOWS, UNIX, OpenVMS, ANDROID, an operating system based on LINUX, or any other appropriate operating system, including future operating systems.

In particular embodiments, the computing system 100 includes a processor, memory, a user interface, and a communication interface. In particular embodiments, the processor includes hardware for executing instructions, such as those making up a computer program. The memory includes main memory for storing instructions such as computer program(s) for the processor to execute, or data for processor to operate on. The memory may include an HDD, a floppy disk drive, flash memory, an optical disc, a magneto-optical disc, magnetic tape, a Universal Serial Bus (USB) drive, a solid-state drive (SSD), or a combination of two or more of these. The memory may include removable or non-removable (or fixed) media, where appropriate. The memory may be internal or external to the computing system 100, where appropriate. In particular embodiments, the memory is non-volatile, solid-state memory.

The user interface includes hardware, software, or both providing one or more interfaces for user communication with the computing system 100. As an example, and not by way of limitation, the user interface may include a keyboard, keypad, microphone, monitor, mouse, printer, scanner, speaker, still camera, stylus, tablet, touchscreen, trackball, video camera, another user interface or a combination of two or more of these.

The communication interface includes hardware, software, or both providing one or more interfaces for communication (e.g., packet-based communication) between the computing system 100, the notification devices 10 and other computing systems over one or more networks 200. The notification devices 10 communicates with the computing system 100 through the network 200 using wireless communication. As an example, and not by way of limitation, the computing system 100 and the notification device 10 may include a communication interface including a wireless NIC (WNIC) or wireless adapter for communicating through the wireless network 200, such as a WI-FI network. This disclosure contemplates any suitable network and any suitable communication interface. As an example, and not by way of limitation, the notification device 10 and the computing system 100 may communicate via an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the notification device 10 and the computing system 100 may communicate via a wireless PAN (WPAN) (e.g., a BLUETOOTH WPAN), a WI-FI network, a WI-MAX network, a cellular telephone network (e.g., a Global System for Mobile Communications (GSM) network), or other suitable wireless network or a combination of two or more of these. The notification device 10 and the computing system 100 may include any suitable communication interface for any of these networks, where appropriate.

A method of tracking and retrieving at least one of a tray and a trolley during a room service order includes the following steps: providing the notification device 10 described above; assigning the notification device 10 to a room number of a hotel room via software running on a computing system 100; delivering the at least one of the tray and the trolley to the hotel room with the notification device 10; and activating the activation device of the notification device 10, thereby sending a wireless communication to the computing system via the wireless communication interface indicating the at least one of the tray and the trolley is ready for pickup from the hotel room.

Upon a guest ordering room service, a hotel staff may activate the notification device 10 by inputting the identifier of the notification device 10 and the guest room number into the computing system 100 via a software program. As mentioned above, the user interface may include a monitor. In such embodiments, the monitor may display which notification devices 10 of the plurality of notification devices 10 are assigned to what hotel rooms. This allows any of the users to walk into a room service work area and know the status of notification devices 10 throughout the hotel. Once the wireless communication is received, the room number moves to an "awaiting retrieval" status. A timer may be started to ensure the hotel staff is completing the retrieval within company standard time. Upon completing the retrieval of the tray or trolley, the hotel staff completes a simple function in the computing system clearing out the room number. This same function also detaches the notification device 10 from the guest room number so it can be used for another guest order.

It should be understood, of course, that the foregoing relates to exemplary embodiments of the invention and that modifications may be made without departing from the spirit and scope of the invention as set forth in the following claims.

What is claimed is:

1. A method of tracking and retrieving at least one of a tray and a trolley during a room service order comprising the steps of:
    providing a notification device comprising:
        a pressure activated button; and
        a wireless communication interface;
    assigning the notification device to a room number of a hotel room via software running on a computing system;
    delivering the at least one of the tray and the trolley to the hotel room with the notification device; and
    pushing the pressure activated button of the notification device, and thereby sending a wireless communication to the computing system via the wireless communication interface indicating the at least one of the tray and the trolley is ready for pickup from the hotel room.

2. The method of claim 1, wherein the pressure activated button is at least one of a mechanical button and a touch-screen button.

3. The method of claim 1, wherein the notification device further comprises:
   a housing; and
   a communication device disposed within the housing, wherein the communication device comprises the wireless communication interface and the activation device.

4. The method of claim 3, wherein the housing is coupled to the at least one of the tray and the trolley.

5. A system of tracking and retrieving at least one of a tray and a trolley during a room service order comprising:
   a notification device comprising:
      a pressure activated button; and
      a wireless communication interface;
   a computing system comprising:
      a processor;
      a memory;
      a wireless communication interface; and
      a user interface, wherein
   the notification device is assigned to a room number of a hotel room via the computing system, and
   upon activation of the pressure activated button of the notification device, a wireless communication is sent from the notification device to the computing system via the wireless communication interfaces indicating the at least one of the tray and the trolley is ready for pickup from the hotel room.

6. The system of claim 5, wherein the pressure activated button is at least one of a mechanical button and a touchscreen button.

7. The system of claim 5, wherein the notification device further comprises:
   a housing; and
   a communication device disposed within the housing, wherein the communication device comprises the wireless communication interface and the pressure activated button.

8. The system of claim 7, wherein the housing is coupled to the at least one of the tray and the trolley.

* * * * *